United States Patent [19]
Sylvain

[11] Patent Number: 6,118,777
[45] Date of Patent: *Sep. 12, 2000

[54] SYSTEM AND METHOD FOR PROVIDING COMPETING LOCAL EXCHANGE CARRIERS UNBUNDLED ACCESS TO SUBSCRIBER ACCESS LINES

[75] Inventor: Dany Sylvain, Gatineau, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/958,396

[22] Filed: Oct. 27, 1997

[51] Int. Cl.[7] .................................................. H04L 12/28
[52] U.S. Cl. ............................................ 370/351; 370/395
[58] Field of Search .................................... 370/351, 352, 370/353, 354, 355, 389, 395, 410, 375, 392, 419, 359; 395/200.8; 379/220, 221

[56] References Cited

U.S. PATENT DOCUMENTS

| | | | |
|---|---|---|---|
| 5,475,749 | 12/1995 | Akinpelu et al. | 379/221 |
| 5,541,917 | 7/1996 | Farris | 370/60.1 |
| 5,550,912 | 8/1996 | Akinpelu et al. | 379/221 |
| 5,574,783 | 11/1996 | Dunn | 379/230 |
| 5,606,595 | 2/1997 | Ejzak | 370/349 |
| 5,610,910 | 3/1997 | Focsaneanu et al. | 370/351 |
| 5,673,255 | 9/1997 | Dunn et al. | 370/244 |
| 5,751,951 | 5/1998 | Osborne et al. | 395/200.8 |
| 5,809,120 | 9/1998 | Montgomery et al. | 379/113 |
| 5,850,444 | 12/1998 | Rune | 380/21 |
| 5,862,136 | 1/1999 | Irwin | 370/395 |
| 5,862,203 | 1/1999 | Wulkan et al. | 379/114 |
| 5,903,639 | 5/1999 | Lipchock et al. | 379/220 |
| 5,905,781 | 5/1999 | McHale et al. | 379/93.14 |

OTHER PUBLICATIONS

Nortel, "Telesis", Issue No. 102, Dec., 1996, pp. 8–11, pp. 14–15.

*Primary Examiner*—Ajit Patel
*Assistant Examiner*—Brian Nguyen

[57] ABSTRACT

A telecommunication switching network is described in which one or more competing local exchange carriers are to be provided with unbundled access to customer premises equipment though subscriber access lines. The customer premises equipment is comprised of user terminals and a customer premises equipment connector that can transmit and receive any combination of telephone, fax, modem, video, and data signals. A line interface module is connected to the customer premises equipment by means of subscriber lines for routing the signals originating with the customer premises equipment ("local access signals") to a competing local access service node, instead of the service node operated by the incumbent local exchange carrier. A network interface module is provided to set up a call path through a generic connectivity network. The generic connectivity network, which is comprised of a number of interconnected switching nodes, transmits the local access signals to and from the service node operated by the competing local exchange carrier.

16 Claims, 9 Drawing Sheets

SYSTEM AND METHOD FOR PROVIDING COMPETING LOCAL EXCHANGE CARRIERS UNBUNDLED ACCESS TO SUBSCRIBER ACCESS LINES

FIELD OF THE INVENTION

This invention relates to telecommunication switching networks in which one or more competing local exchange carriers are to be provided with unbundled access to subscriber access lines which form part of the public switched telephone network.

BACKGROUND OF THE INVENTION

With the passage of the Telecommunications Act ("the Act") of 1996, the United States telecommunications industry is in a state of radical change. Among other things, the Act requires that Incumbent Local Exchange Carriers (ILEC) the regulated entity that owns and administers an existing access network provide to any requesting telecommunications carrier (hereinafter referred to as "Competing Local Exchange Carriers" (CLEC)) nondiscriminatory access to network elements on an unbundled basis to allow CLECs to combine such network elements in order to provide telecommunications service. As well, ILECs have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays. The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. As well, a CLEC can offer multiple type of services, including basic POTS, long distance, ISP (Internet Service Provider), video, etc.

Figure 1:
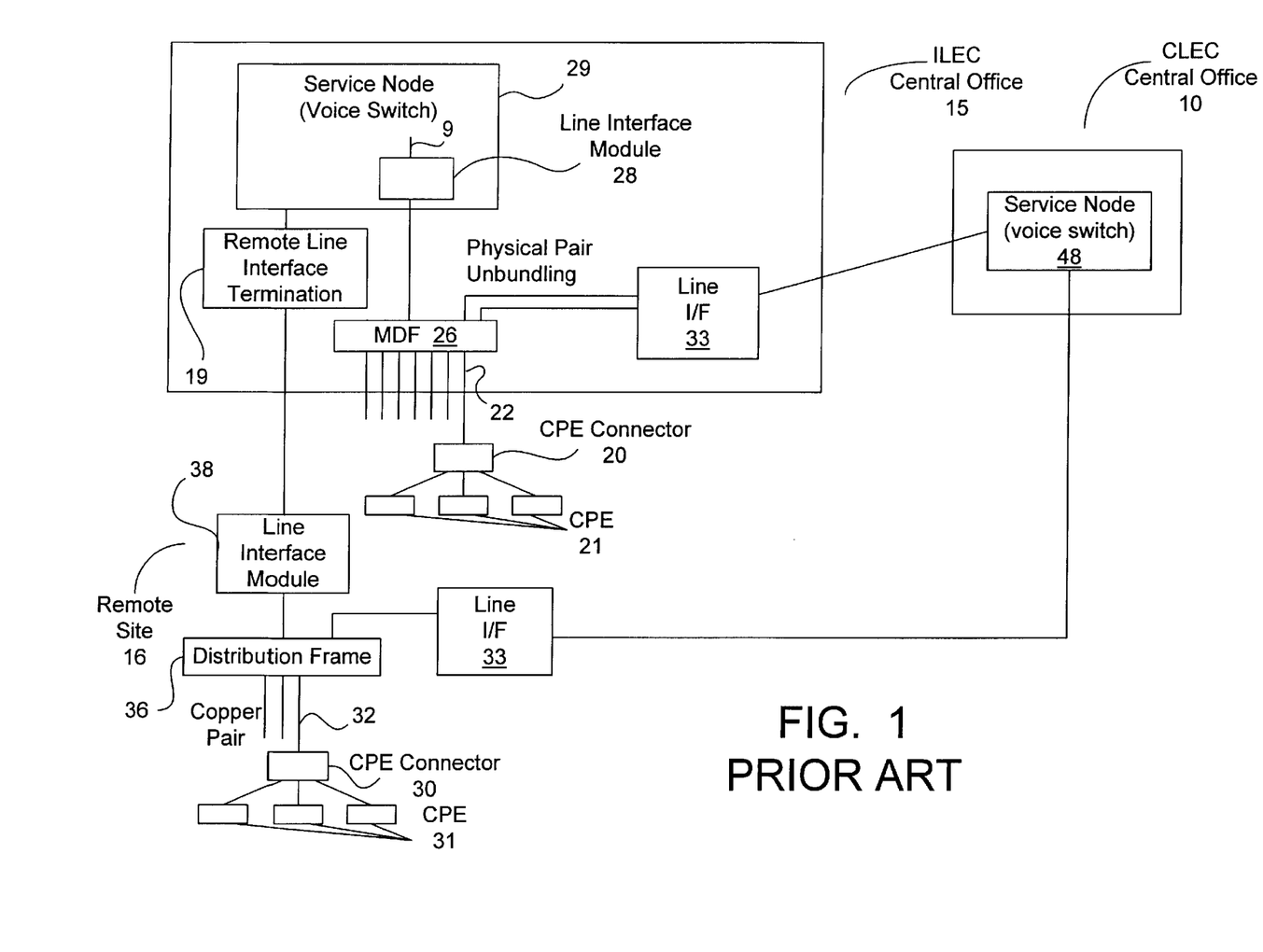
FIG. 1 is a block diagram showing unbundled access by a Competing Local Exchange Carrier (CLEC) 10 to Customer Premises Equipment (CPE) in accordance with the prior art.

The prior art teaches at least two means of implementing the requirement for unbundled access to ILEC network elements. FIG. 1 shows how a CLEC central office 10 can be provided unbundled access to the subscriber lines, ie. the copper pair of wires 22, 32 leading from the ILEC Central Office (CO) 15 to the customer site. Two configurations of ILEC equipment for servicing customer equipment are shown in FIG. 1, direct copper-wire pair, and remote terminal (e.g. subscriber loop carrier).

With respect to the direct copper-wire pair configuration of ILEC equipment, a plurality of copper pairs 22 are shown being terminated at a Main Distribution Frame (MDF) 26 located at the ILEC central office 15. Though in this case local access is provided generally by a pair of twisted copper wires, many other local access facilities are available for different bandwidths, such as wireless, fibre optics, coax cable, etc. The ILEC central office 15 is connected to the Public Subscriber Telephone Network (PSTN) (not shown).

Each of these copper pairs 22 connects a different Customer Premises Equipment (CPE) connector 20 to the ILEC central office 15, for eventual connection to the Public Subscriber Telephone Network (PSTN). CPE devices 21 can be POTS, data terminal, fax, ISDN terminal, etc. Though only one CPE connector 20 is shown, there are CPE connectors terminating on each copper pair 22. A plurality of CPE devices 21 can be connected to the CPE connector in the subscriber's premises, all sharing a common copper pair.

The MDF 26 is connected to a line interface module 28 located within the ILEC voice switch 29. A CLEC that wishes to have unbundled access to the subscriber line 22 must physically connect that subscriber line 22 to its own access device (in this case a line interface module 33), typically located within the physical limits of the ILEC central office 15. This access device is connected to the CLEC service node (for example, a voice switch) 48. However, the ILEC central office 15 has a limited amount of space to accommodate CLEC access devices. As the number of CLECs (each of whom will be deploying their own access devices) increases, the ILEC would suffer physical congestion at its CO 15, the MDF 26 would have to be expanded significantly, both of which could also give rise to administrative difficulties and costs. For traffic that is not to be rerouted to the CLEC central office 10, there is provided a connection 9 within the service node (voice switch) 29 in the ILEC central office 15.

With respect to the remote access configuration of ILEC equipment, a plurality of copper pairs 32 are shown being terminated at a remote Distribution Frame (DF) 36 located at the remote site 16. Each of these copper pairs 32 connects a different CPE connectors 30 and CPE devices 31 to the remote site 16, for eventual connection to the ILEC central office 15, and to the Public Subscriber Telephone Network (PSTN). The remote DF 36 is connected to a line interface module 38 which connects to the ILEC service node (voice switch) 29 via a remote line interface termination module 19. A CLEC who wishes to have unbundled access to the CPE connector 30 must physically connect the copper pair 32 to its own access device (in this case a line interface module 33), typically co-located with the remote line interface termination module 19. This access device is connected to the CLEC service node (voice switch) 48. The remote line interface termination module 19 is often located on the curb side and co-location can be extremely difficult to implement.

It is generally a cumbersome and costly exercise for a CLEC to deploy numerous access devices to reach its customers, who may be scattered over a wide area. The above method of implementing unbundled access gives rise to significant cost and deployment difficulties for both CLECs and ILECs.

A second method of providing unbundled access to network services is disclosed in U.S. Pat. No. 5,610,910, issued Mar. 11, 1997 (Focsaneanu) (hereinafter referred to as the '910 Patent). The '910 Patent discloses a method of interfacing Customer Premises Equipment (CPE) connectors and communications networks (such as PSTN, data networks, wireless networks, satellite networks, CATV, ATM networks) through local access. Data or voice messages destined to, or originating with CPEs can be routed through a variety of communications networks, any of which can be provided by an ILEC or CLEC. Unbundled access to network services is provided without the need for physical unbundling of copper wire pairs.

Figure 2:
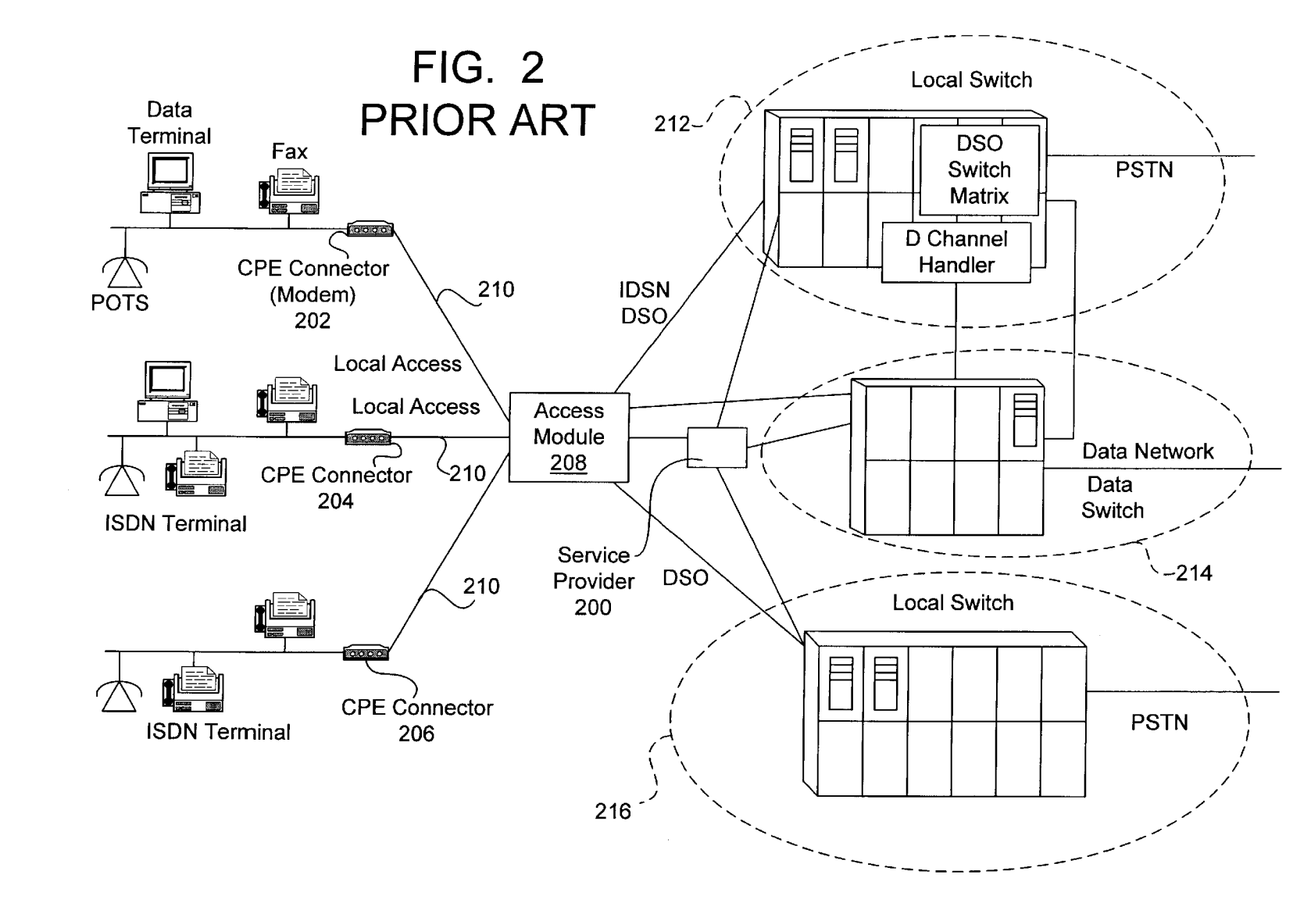
FIG. 2 is a block diagram showing access to various service providers in accordance with the prior art.

FIG. 2 shows the configuration of equipment that makes up the system disclosed in the '910 patent in which a plurality of CPEs can access a plurality of different service providers offering different services, e.g. PSTN 212, 216 and data switched network 214. PSTN 212 may be the transport network of one service provider, whereas data network 214 and PSTN 216 may constitute the transport network of one or more different service providers. Though there is shown one service provider 200, there are in reality many service providers including PSTN providers, data switched network providers, data network access service providers, etc. CPEs are able to seamlessly access various services provided by the service provider 200 through subscriber lines 210, CPE connectors 202, 204, 206 and an access module 208.

In FIG. 2, three groups of different CPES, e.g. a POTS, data terminal, fax, ISDN terminal etc. are connected to three different CPE connectors 202, 204, 206 with differing capabilities. Each CPE connector operates with the access module 208 through its local access. The access module 208 contains a plurality of line interfaces, each interface looking after each local access. The access module 208 connects service providers who may have their own networks or may utilize any of a plurality of transport networks 212, 214 and 216 for services requested by CPEs. In FIG. 2, three transport networks 212, 214, 216 are shown for illustration only. The access module is capable of routing messages from CPEs to a greater number of transport networks (ILECs, CLECS, or any combination thereof) than the number shown in FIG. 2. Apart from the hardware present in the access module 208, there is no specialized equipment that needs to be present in the ILEC central office to provide various service providers unbundled access to the CPEs.

The '910 Patent also discloses a method for interfacing the CPEs to the multiple service providers offering multiple services. The method includes a step of the access module 208 extracting information content from traffic to determine requested services of said traffic. The method further includes steps of determining appropriate routing for the traffic to/from a plurality of service providers.

The inventive features of the '910 Patent constitute a real advantage over the implementation of unbundled access described in connection with FIG. 1, in that not only may users have direct access to multiple CLECs, but they may choose different CLECs to carry different kinds of traffic at the same time (ie. POTS, fax, modem, etc.).

SUMMARY OF THE INVENTION

It is a general object of the present invention to provide a means for connecting customer premises equipment to one or several service networks or service nodes operated by one or more competing local exchange carriers (CLECs) through a generic connectivity network. The use of the generic connectivity network to perform routing between the customer premises equipment and the competing local exchange carrier switch improves the potential for scaleability, is cost effective, and is easy to administer.

The present invention provides a system for providing competing local exchange carriers access to subscriber access lines and customer premises equipment, the system comprising: a plurality of subscriber lines connecting said customer premises equipment to a line interface module, the line interface module having a first output connected to a service node of an incumbent local exchange carrier and a second output connected to a network interface module, the line interface module being adapted to switch traffic received on a subscriber line selectively to the first output or the second output in accordance with at least one of characteristics of the traffic and parameters associated with the subscriber line; said network interface module being connected to a generic connectivity network, said generic connectivity network having a plurality of interconnected switches and transmission equipment for connecting traffic appearing at the second output of the line interface module to a service node operated by said competing local exchange carrier.

The customer premises equipment is comprised of user terminals and a customer premises equipment connector that can transmit and receive any combination of telephone, fax, modem, video, and data signals. A line interface module is connected to the customer premises equipment by means of subscriber lines for routing the signals originating with the customer premises equipment ("local access signals") to the competing local access switch, instead of the switch operated by the incumbent local exchange carrier. A network interface module is provided to set up a call path through the generic connectivity network. The generic connectivity network, which is comprised of a number of interconnected data switches, transmits the local access signals to and from the switch operated by the competing local exchange carrier.

According to another aspect of the invention, there is provided a network interface module for switching cells between a line interface module and a generic connectivity network, said cells consisting of data and a cell header, said network interface module comprising a cell multiplexer portion for multiplexing cells received from said line interface module to form a cell stream; a network interface portion connected to said cell multiplex portion for transmitting and receiving said cell stream to and from said generic connectivity network; and a cell demultiplexer portion for demultiplexing said cell stream to form cells destined for transmission to said line interface module, said cell demultiplexer portion including a traffic shaping/pacing controller for regulating the data rate of said cells.

According to yet another aspect of the invention, there is provided a method for establishing a connection between customer premises equipment and a competing local exchange carrier, wherein there is a system comprising a plurality of subscriber lines connecting said customer premises equipment to a line interface module controlled by an incumbent local exchange carrier, the line interface module having a first output connected to a service node of the incumbent local exchange carrier and a second output connected to a network interface module, said network interface module being connected to a generic connectivity network, said generic connectivity network having a plurality of interconnected switches and transmission equipment for connecting traffic appearing at the second output of the line interface module to a service node operated by said competing local exchange carrier, said method comprising the steps of: receiving traffic from said subscriber line at said line interface module initiated at said customer premises equipment; said line interface module switching said traffic selectively to the first output or the second output in accordance with at least one of characteristics of the traffic and parameters associated with the subscriber line, if said traffic is switched to said second output, said network interface module receiving said traffic and setting up a traffic path through said generic connectivity network; and said generic connectivity network transmitting said traffic to said service node operated by said competing local exchange carrier.

DETAILED DESCRIPTION OF THE PREFERRED EMBODIMENT

Figure 3:
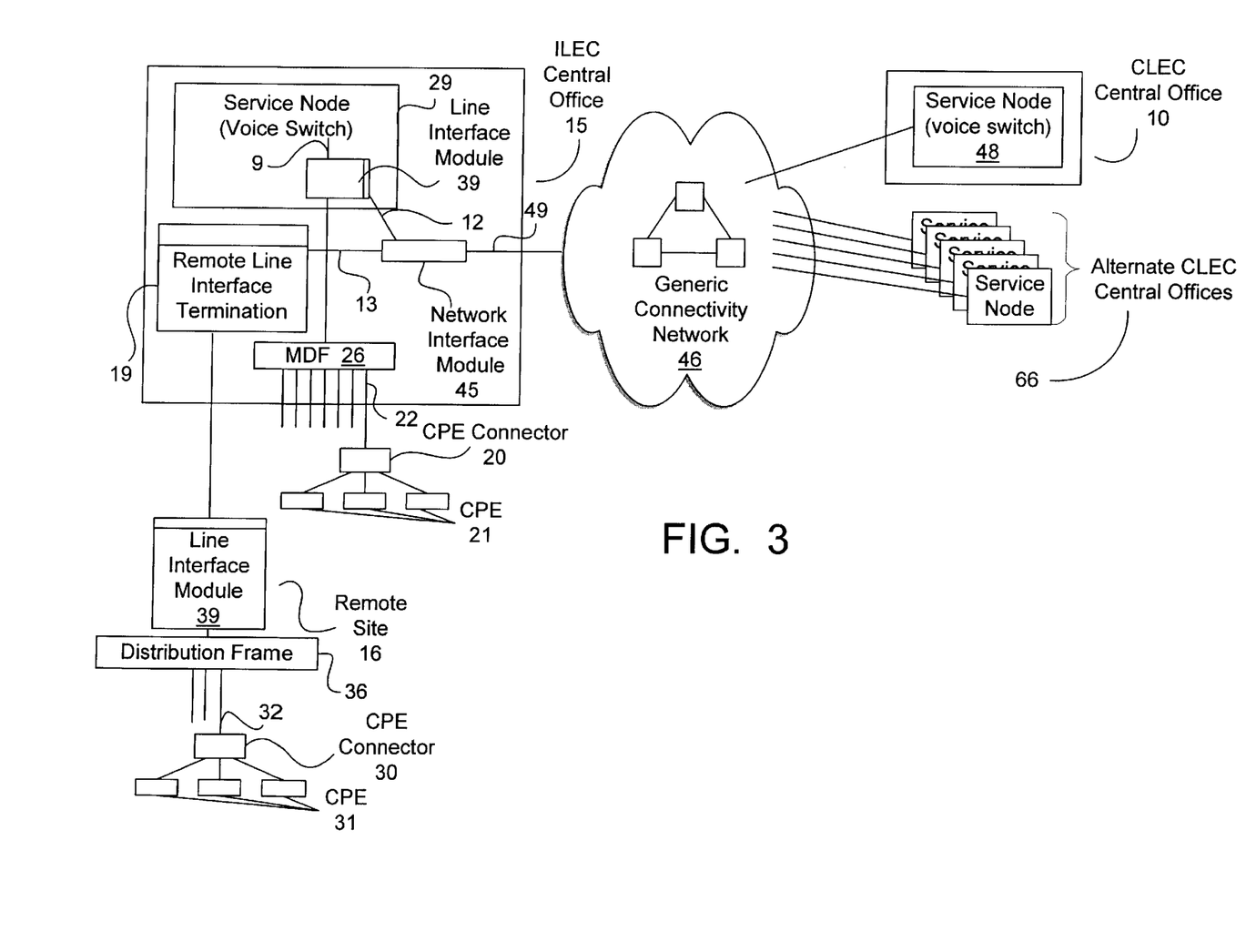
FIG. 3 is a block diagram of the major components of the present invention.

FIG. 3 illustrates the major components of the present invention in block diagram form. The CPE connector 20 and the attached CPE devices 21 are connected to the Main Distribution Frame (MDF) 26 by means of the subscriber access lines 22 which may comprise a twisted pair of copper wires (though the present invention may be used in association with any other local access facility such as wireless, fibre optics, coax cable, etc.). A line interface module 39 terminates the subscriber access lines 22 and is similar to the line interface module 28 shown in FIG. 1, but contains additional hardware to allow for unbundling and routing to the CLEC service node 48. For traffic that is not to be re-routed to the CLEC central office 10, there is provided a connection 9 within the service node (voice switch) 29 in the ILEC central office 15. The service node is typically connected to a larger network (not shown), such as the PSTN, to provide the desired services. In the example shown here, the service node is a telephony voice switch but can also be a variety of different service nodes, depending on services subscribed to by a customer. For traffic that is to be routed to the CLEC service node 48, there is provided a connection 12 to a Network Interface Module (NIM) 45. The switching feature to the NIM is accomplished by provisioning the subscriber line which terminates at the line interface module. The provisioning database maintained by the ILEC will determine whether a specific traffic type (voice call, data, video, etc.) received on a subscriber line will be passed through to service node 29, or be switched to the network interface module 45. The NIM 45 is typically co-located with the line interface module 9 at the ILEC central office 29. The NIM 45 is typically owned by, and controlled by the ILEC 15. Of course, traffic can be routed to any one of the service nodes of the alternate CLEC central offices 66. Service nodes operated by CLECs can be voice switches, Internet Service Provider (ISP) gateway, corporate network gateway, video gateway, etc.

For subscribers whose local access is provided by means of a remote line interface at a remote site 16, subscriber lines 32 connect the CPE connector 30 and CPE devices 31 to the remote DF 36. Line interface module 39 connects the remote DF 36 to the ILEC service node (voice switch) 29. Remote Line Interface Termination (RLIT) 19 is connected to the ILEC service node (voice switch) 29 for calls that are to be routed by the ILEC. For calls that are to be routed to the CLEC service node 48, a connection 13 is provided to the network interface module (NIM) 45. The RLIT 19 contains additional hardware, as compared to RLIT 19 of FIG. 1, to allow for unbundling and routing to the CLEC service node 48.

The NIM 45 is responsible for providing the interface between a plurality of line interface modules 19, 39 to a generic connectivity network 46. Working in tandem with each other, the line interface modules 19, 39 and the NIM 45 allow for a CLEC central office 10 to have unbundled access to the subscriber lines 22, 32 without the need for physical unbundling of twisted copper pairs. Furthermore, the present invention only requires the provision of one multiplexed connection 49 between the NIM 45 and the generic connectivity network 46. The use of the generic connectivity network 46 to perform routing between the CPEs and the service node 48 of the CLEC central office 10 improves the potential for scaleability, is cost effective, and is easy to administer. Further details concerning the configuration of the generic connectivity network 46 are provided below.

At the far end of the generic connectivity network 46 is the CLEC central office 10 equipment, which comprises the service node 48. Alternate CLEC central offices 66 are also connected to the generic connectivity network, each with their own service node. CLEC service nodes may accommodate any of voice, fax, modem, video, data, etc. traffic. The use of a generic connectivity network 46 interspaced between the ILEC 15 and the CLEC central office 10 and line interface modules 19, 39 that can flexibly route connections means that the CLEC does not have to invest in any equipment that needs to be co-located with ILEC equipment. The addition of new CLECs is accomplished by setting up the proper routing information in the NIM 45 and the generic connectivity network 46, and adding a network connection from the generic connectivity network to the new CLEC.

Figure 4:
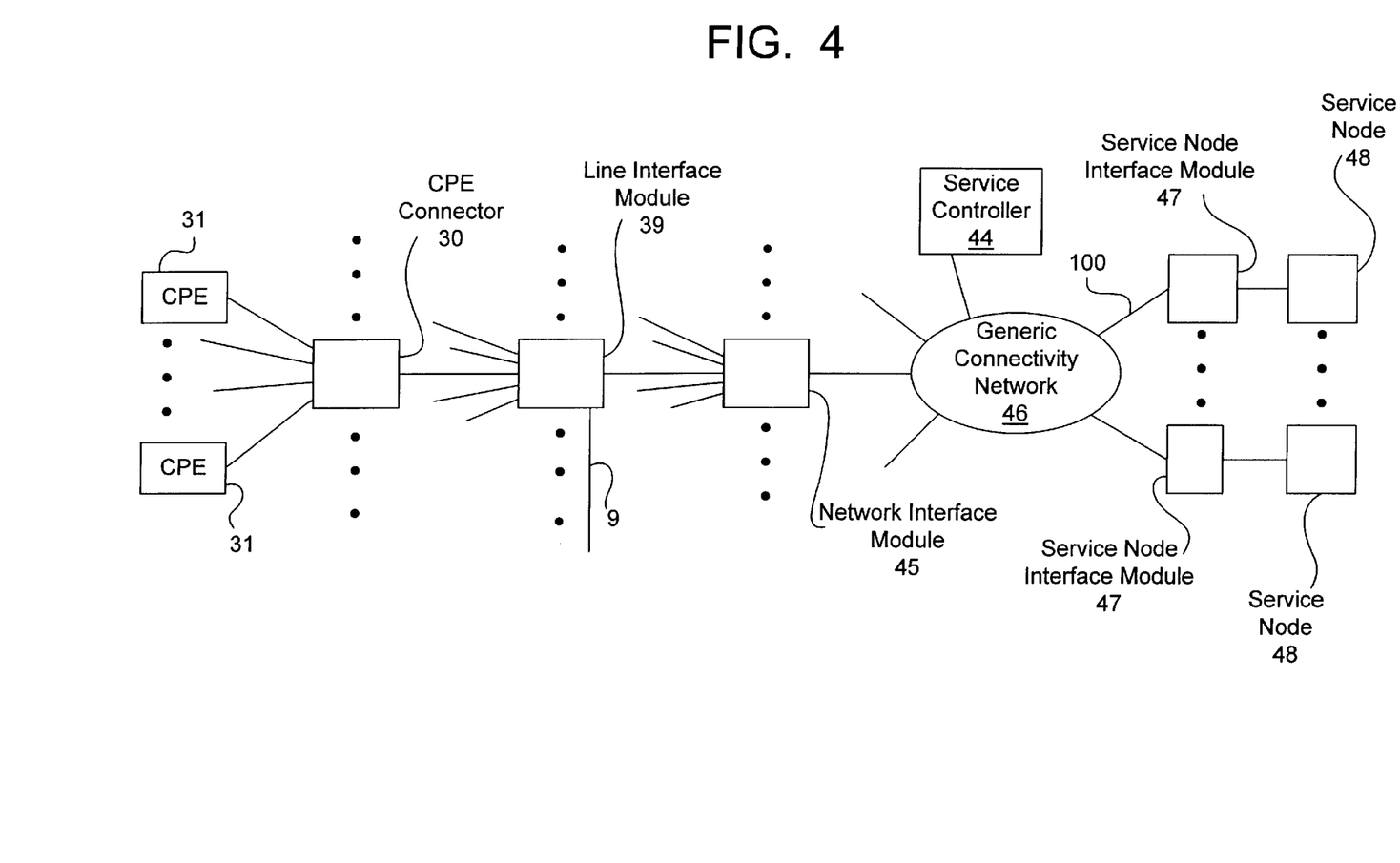
FIG. 4 is a block diagram showing the end-to-end connectivity between the end user systems and a plurality of Service Nodes in accordance with the present invention.

FIG. 4 shows the end-to-end connectivity between the CPE devices 31 and a plurality of CLEC service nodes 48. The CPE devices 31 could be any of telephone, data terminal, television, fax, ISDN terminal, etc. which are connected to a CPE connector 30. The CPE connector 30, which is co-located with the CPE devices 31 provides an interface between the CPE devices 31 and the line interface module 39. The CPE connector 30 also provides the multiplexing function when multiple CPE devices 31 are used at the customer premises. In its simplest form, the CPE connector 30 performs no more than an electrical wired "OR" function.

The line interface module 39 terminates multiple long range interfaces and provides a first stage of multiplexing and concentration. The line interface module 39 can be based on existing line modules used today to provide mostly voice services. Connection 9 is provided to existing service nodes (voice switches) operated by the ILEC (such as DMS-100™, 5ESS™, etc.), and is used for existing lines and end users who do not require the new functionality disclosed by the present invention.

The line interface module 39 interfaces to another functional unit, the NIM 45, which provides the connectivity to the generic connectivity network 46. The NIM 45 interfaces with a plurality of line interface modules 39 and provides a second stage of multiplexing and concentration. In another embodiment, the line interface modules 39 and the NIM 45 could be integrated into a single entity, such as the access module 208 illustrated in FIG. 2, with the difference that the access module now uses the generic connectivity network to establish connections to the service nodes. The NIM 45 provides the necessary interfaces, protocols, etc. required to communicate with the generic connectivity network 46.

The generic connectivity network 46 provides a generic connectivity service to the devices which connect to it. Such a network could be based on any one of, or combination of Asynchronous Transfer Modes (ATM), Internet Protocols (IP), Frame Relay, X.25, Switched Multimegabit Data System (SMDS) networks or any other type of network or combination of networks that allows two end points to communicate with each other. The generic connectivity network 46 performs the transportation and routing functions necessary to the implementation of the present invention. The use of a generic connectivity network means that there is no need for direct connections from the ILEC central office to the CLEC service nodes. Instead, only one network connection 100 per CLEC is needed. This single connection 100 is preferably high-speed and multiplexed, designed to address a very wide geographic area. The bandwidth allocated to this single connection 100 can be easily modified to address changing traffic patterns.

Connections through the generic connectivity network 46 can be established by various methods. In one instance, where the generic connectivity network 46 is an ATM network, the NIM 45 can request a connection using standard ATM signalling messages (like ATM Forum UNI specification). The request will state the ATM address of the node to be reached, in this case a service node interface module 47, the required bandwidth and other connection characteristics. The ATM switches part of the generic connectivity network 46 will take this request and negotiate between them the best way to route the connection (using, for example, ATM Forum PNNI specification).

It is important to note that the control function of the NIM 45 does not have to be physically integrated and could be remoted. In one instance, the information used to set up connections comes from ILEC provisioning systems and permanently allocates a given subscriber access line to a given CLEC or service node. In another instance, the subscriber himself can request for specific connectivity. To do so, various signalling methods can be used, from conventional DTMF to Broadband ISDN (Q2931 standard). In these instances, the signalling information is sent to a service controller 44 which interprets the signalling information and then proceeds to set up the end to end connection. In another instance, a customer could be accessing different services provided by different CLECs, with all services sharing a common access line 22.

The service node interface module 47 provides an interface between the CLEC service nodes 48 and the generic connectivity network 46. This interface is necessary because the traffic originating with the end users destined to one or more of the service nodes (voice switches) 48 can be of a variety of types (telephony, video, data, etc.). The service node interface module 47 provides the necessary translations and interworking functions. Of course, service node interface module 47 could be integrated with service nodes (voice switches) 48.

Figure 5:
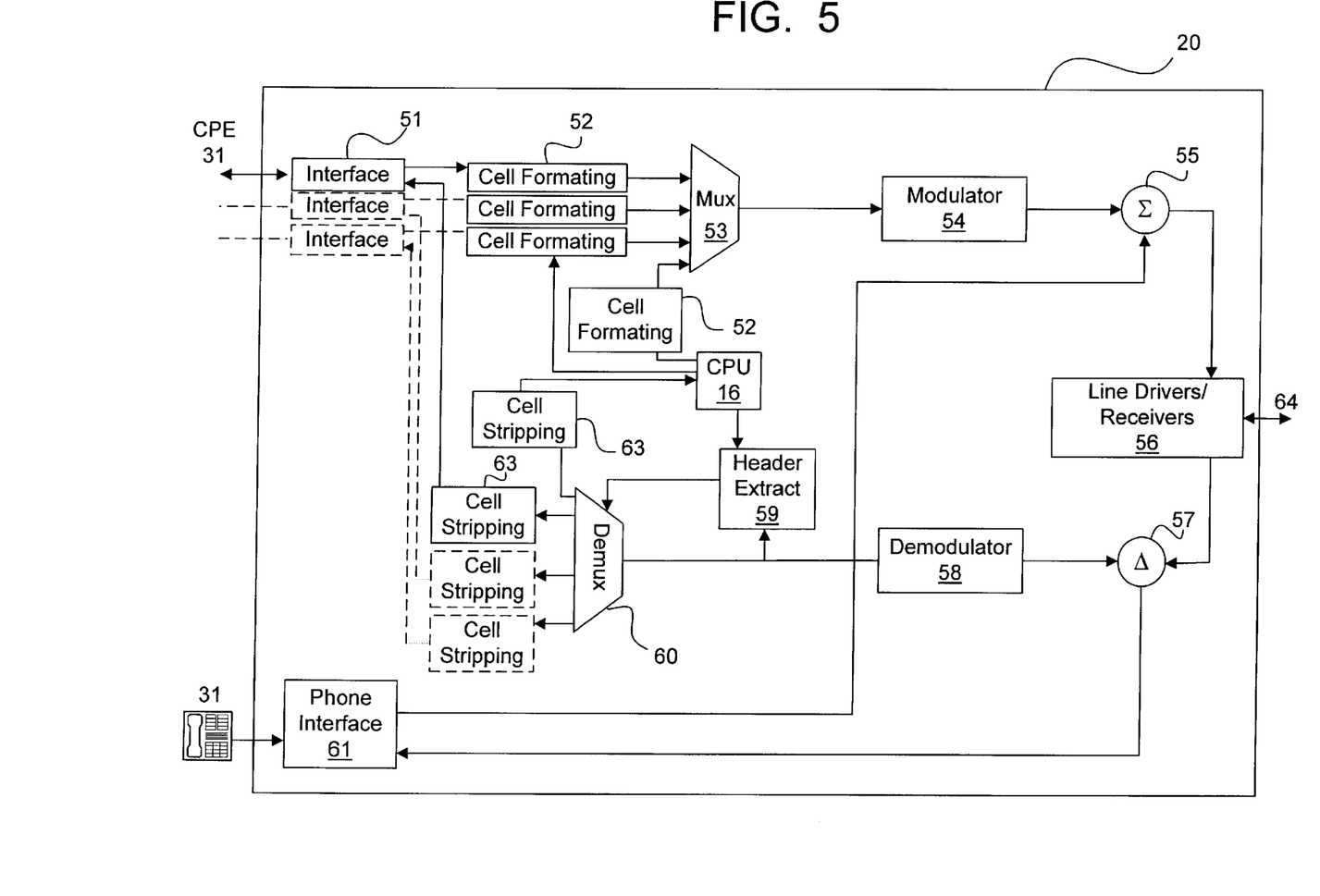
FIG. 5 is a block diagram of the Customer Premises Equipment (CPE) connector.

FIG. 5 is a block diagram of an instance of CPE connector 20, which is designed to deal with several types of interfaces 51, 61 connecting to different kinds of CPE devices 31 (such as voice, fax, modem, ISDN, etc.). In its simplest form, the CPE connector 20 just provides an electrical connection between a telephone 31 (which in this example is the CPE device) and the subscriber access line 64. In this figure, the CPE connector 20 is shown to have a high-speed interface to the line interface module, allowing multiple user side interfaces 51, 61 to be multiplexed over the same channel 64. Persons skilled in the art will appreciate that there are two principal ways to multiplex different traffic together, time domain multiplexing and frequency multiplexing. While either of these methods can be implemented into the CPE connector, FIG. 5 shows a combination of both of these methods.

The existing telephony signals, using the baseband spectrum of about 4–10 KHz is not interfered with through the phone interface 61, and is multiplexed 55 with time multiplexed signals, modulated at higher frequencies by modulator 54. The other interfaces 51 convert the incoming signals into the digital domain. If those signals are already in digital format, they are then buffered and rate adapted before multiplexing.

In order to multiplex different signal sources and later be able to de-multiplex, some form of convention is needed. The technique shown here uses cell formatters 52 that cell format the signals into fixed length data packets, where each cell is preceded with an address header. An example of the implementation of cell formatting is ATM. Variable length packets and fixed allocation of time slots could also be used. In a simplified implementation where only one digital interface 51 is used, it will not be necessary to perform time domain multiplexing. In these circumstances, the cost of the CPE connector could be reduced accordingly.

The output from the cell formatters 52 are time multiplexed by a multiplexer 53 and forwarded to a frequency modulator 54 which encodes the digital data stream in the analog domain, using one of the generally used modulation techniques (e.g. 64 QAM). This signal would be typically mixed 55 with the baseband voice signal and sent to line drivers/receivers block 56 which provides the correct impedance and signal levels for interfacing the subscriber access line 64 to the line interface module (not shown).

On the receive side, signals from the subscriber access line 64 are processed by line drivers/receivers block 56 which restores the proper levels. The baseband signal is split off by a filter 57 and the high-speed data is passed to the demodulator 58 which decodes the analog signals back into digital format. In circumstances where multiple services are carried on one line, the multiplexed signals must be demultiplexed. Persons skilled in the art will understand that multiple demultiplexing techniques can be used for this purpose. In the example illustrated in FIG. 5, the header from the incoming cells (in the ATM method) are examined by a header extract 59 and used to drive a demultiplexer 60. The cell formatting is removed in cell stripping blocks 63 and forwarded to the user interfaces 51 and CPE devices 31.

Though only one instance of a customer premises equipment connector is shown in FIG. 5, persons skilled in the art will appreciate that this device can incorporate functionality to communicate with networks which encompass one or more of PSTN, data networks, wireless networks, satellite networks, CATV, ATM networks.

Figure 6:
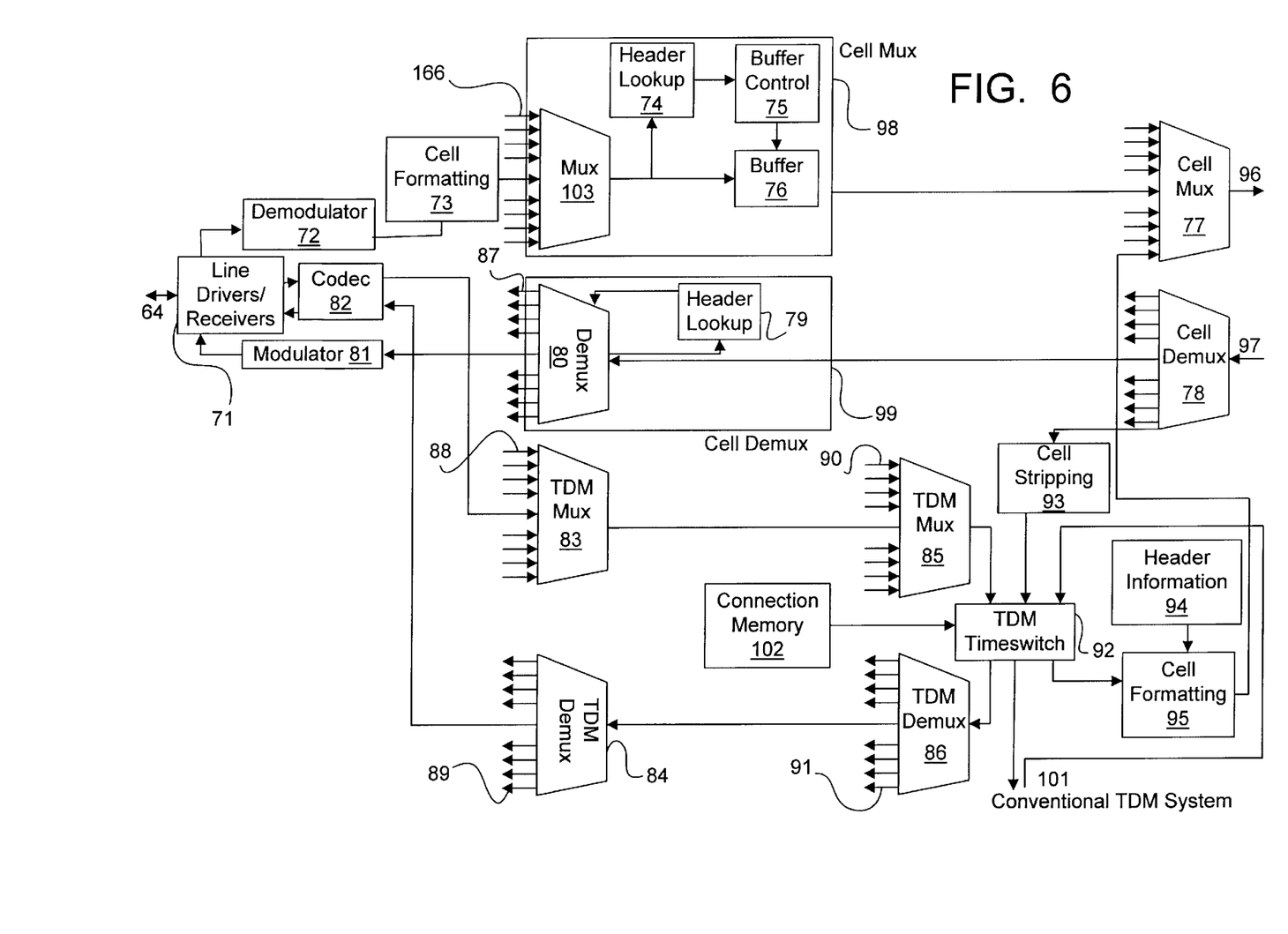
FIG. 6 is a block diagram of a typical implementation of the line interface module of the present invention.

FIG. 6 is a block diagram of a typical implementation of the line interface module. In this implementation there is shown a number of pieces of line interface equipment 71, 72, 81, 82 that are complementary to CPE equipment. These include equivalent line drivers/receivers block 71, high speed data modulator 81, and demodulator 72. A traditional voiceband codec 82 is used here to digitize the voice that was left in the analog domain in the CPE. In scenarios where the voice would be digitized in the CPE, the codec 82 would not be required. For simple CPEs that do not support multiple user interfaces and do not employ multiplexing techniques, cell formatting would be provided by an optional cell formatter 73 in the line interface module.

Modulator 81, demodulator 72, cell formatter 73, cell multiplexers 77, 98, cell demultiplexers 78, 99, cell stripping block 93, cell formatter 95, and header information block 94 comprise the additional hardware that is not present in line interface module 28 of FIG. 1. This additional hardware is used to set up an alternative digital path to/from the network interface module. To provide unbundled access uniquely for POTS service, blocks 73, 98, 99 are not required.

Provisioning information concerning each subscriber line for POTS service is stored in the expanded connection memory 102 which will be used to instruct the TDM timeswitch 92 when to switch the incoming calls between the conventional TDM system 101, and the connection 96 to the NIM. Whereas a TDM timeswitch used in association with the line interface module 28 of FIG. 1 would only be required to accommodate two inputs (TDM Mux 85 and conventional TDM system 101) and two outputs (TDM Demux 86 and conventional TDM system 101), the expanded TDM timeswitch 92 of FIG. 6 must also accommodate a third input (cell stripping 93), and a third output (cell formatting 95).

A frequency discrimination function taking place in line receiver 71 would identify the characteristics of high-speed data traffic destined for cell multiplexer 98. Generally, high-speed data traffic having frequencies above 10 KHz would be transmitted to demodulator 72, whereas baseband frequencies between 0 and 10 KHz would be transmitted to Codec 82. The optional cell formatter 73 formats the high-speed data traffic into cells for multiplexing by cell multiplexer 98 into a cell stream. Cell formatter 73 is required only if the CPE, in simplified implementations, has not already done cell formatting. The output from the different line interfaces 166 are sent to a cell multiplexer 98 which provides a first level of statistical multiplexing and traffic concentration. The cell multiplexer 98 can be constructed in several ways. In the example illustrated in FIG. 6, a first multiplexer 103 places the different inputs on a common bus. The header information from each cell is looked up by a header lookup 74 which informs a buffer controller 75 of the incoming traffic. The buffer controller then decides how to put the information in a common buffer 76. A second stage of cell multiplexing 77 may be used in cases where the line interface module handles very large numbers of lines. As well, cell multiplexer 77 will interleave data traffic received from cell mux 98 with POTS call traffic received from cell formatter 95. Multiplexed data in cell format would be carried on communication lines 96 to the network interface module.

Telephony information is shown taking a different path 88 to TDM multiplexers 83 (with a second stage of TDM multiplexing 90, if required) before being fed to a timeswitch 92. The timeswitch 92 provides the channel mapping and concentration functions and is controlled by a local connection memory 102. To fit into the cell format of the rest of the system, the TDM information from the timeswitch is passed through a cell formatter 95 which uses the information stored in the header information block 94. The resulting cell stream is multiplexed by the cell multiplexer 77 with the other cells.

In the receive direction, the information carried on communication line 97 from the network interface module is demultiplexed by a cell demultiplexer 78. A second stage of demultiplexing may also be required by cell demultiplexer 99. In the cell demultiplexer 99, header information is examined by header lookup 79 and is used to drive a demultiplexer 80. The demultiplexed data stream is then sent to different line interfaces 87.

In the case of a telephony call, the cell formatting is removed by a cell stripping 93 and is sent to the timeswitch 92 which will arrange the information in the correct order to send the information to one or several TDM demultiplexers 84, 86, that will eventually arrive at the codec 82.

In a scenario where the line interface module is already interfacing to classical service nodes (voice switches) such as Nortel DMS-100™, the interfaces used previously for carrying the telephony information 101 can be used for the lines that do not require any more than classical telephony services.

Figure 7:
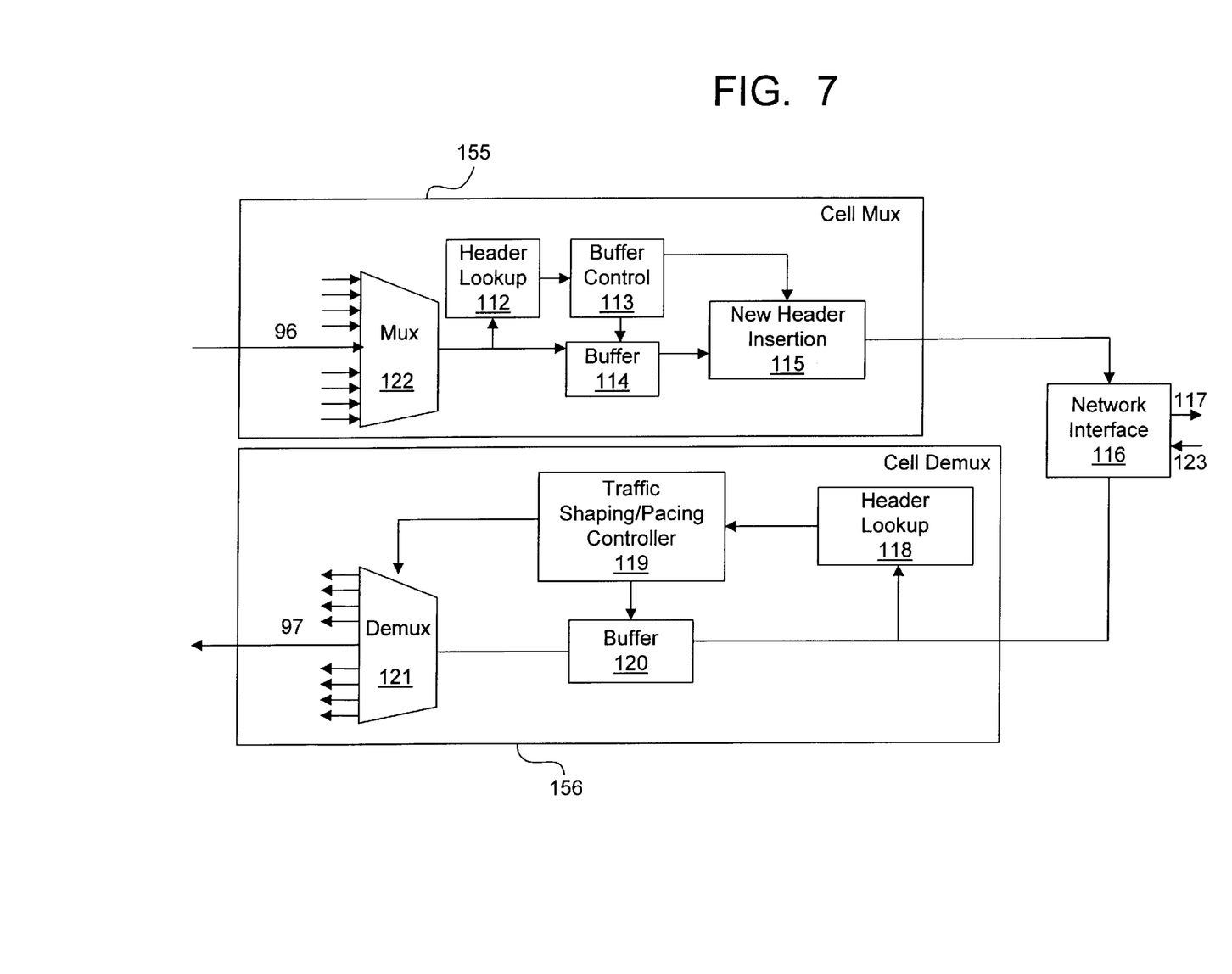
FIG. 7 is a block diagram of the network interface module of the present invention.

FIG. 7 is a block diagram of the network interface module of the present invention. The network interface module is responsible for providing the interface to the generic connectivity network for a plurality of line interface modules. Where the generic connectivity network is an ATM network, much of the functionality of the NIM (which the exception of traffic shaping/pacing) can be accomplished by an ATM edge switch.

The incoming information carried on communication line 96 is multiplexed by cell multiplexer 155 which is comprised of multiplexer 122, header lookup 112, buffer control 113, buffer 114, and new header insertion 115. After being received by multiplexer 122, the cell header information is then looked up by header lookup 112 and is sent to buffer control 113 which manages how information is written and read from buffer 114. In addition, buffer control 113 controls the header information modification by new header insertion 115 which may be necessary before the cell stream interfaces the generic connectivity network. Where modification is necessary, a destination path identifier and destination channel identifier is written into the cell header. The cell stream with the proper header information is sent via the network interface 116 to the generic connectivity network over communication line 117.

Traffic received from the generic connectivity network over communication line 123 is received at the network interface 116, and sent to cell demultiplexer 156, which is comprised of buffer 120, header lookup 118, traffic shaping/pacing controller 119, and demultiplexer 121. The cell header information is extracted by header lookup 118 and sent to traffic shaping/pacing controller 119 which manages how the information is written and read from the buffer 120. It manages the cell rate destined to any CPE to ensure that the cell rate does not exceed what the end system can receive. Where the generic connectivity network is an ATM network, multiple virtual connections can be handled by traffic shaping/pacing controller 119 for the purpose of managing group scheduling for a variety of services, each of which having its own data rate. The use of the traffic shaping/pacing controller 119 avoids buffering requirements in the downstream equipment, and in this embodiment in the line interface module and the CPE controller, thereby reducing the cost and improving the overall efficiency of the network. From the buffer 120, the cell stream is demultiplexed at demultiplexer 121 before being sent to various line interface modules over communication lines 97.

The network interface module may be constructed with hardware to accommodate either the receive path only, or the transmit path only. This would be used in the context of services such as broadcast video which are typically downstream only.

Persons skilled in the art will appreciate that the network interface module could be constructed with hardware elements that would support other forms of data transmission, such as Frame Relay, Internet Protocol, Time Division Multiplexing, and Frequency Domain Multiplexing.

While the LIM and NIM are illustrated and described as separate entities, it should be apparent to one skilled in the art that they could be formed as a single component. Accordingly, the word "module" used in the description and in the claims in relation to "line interface module" and "network interface module" does not mean or imply that these entities necessarily are separate.

As well, it should be apparent to persons skilled in the art that the present invention is not only restricted to fixed length cells, but is also designed to cover transmissions that comprise variable length cells, such as in a packet switching environment.

Figure 8:
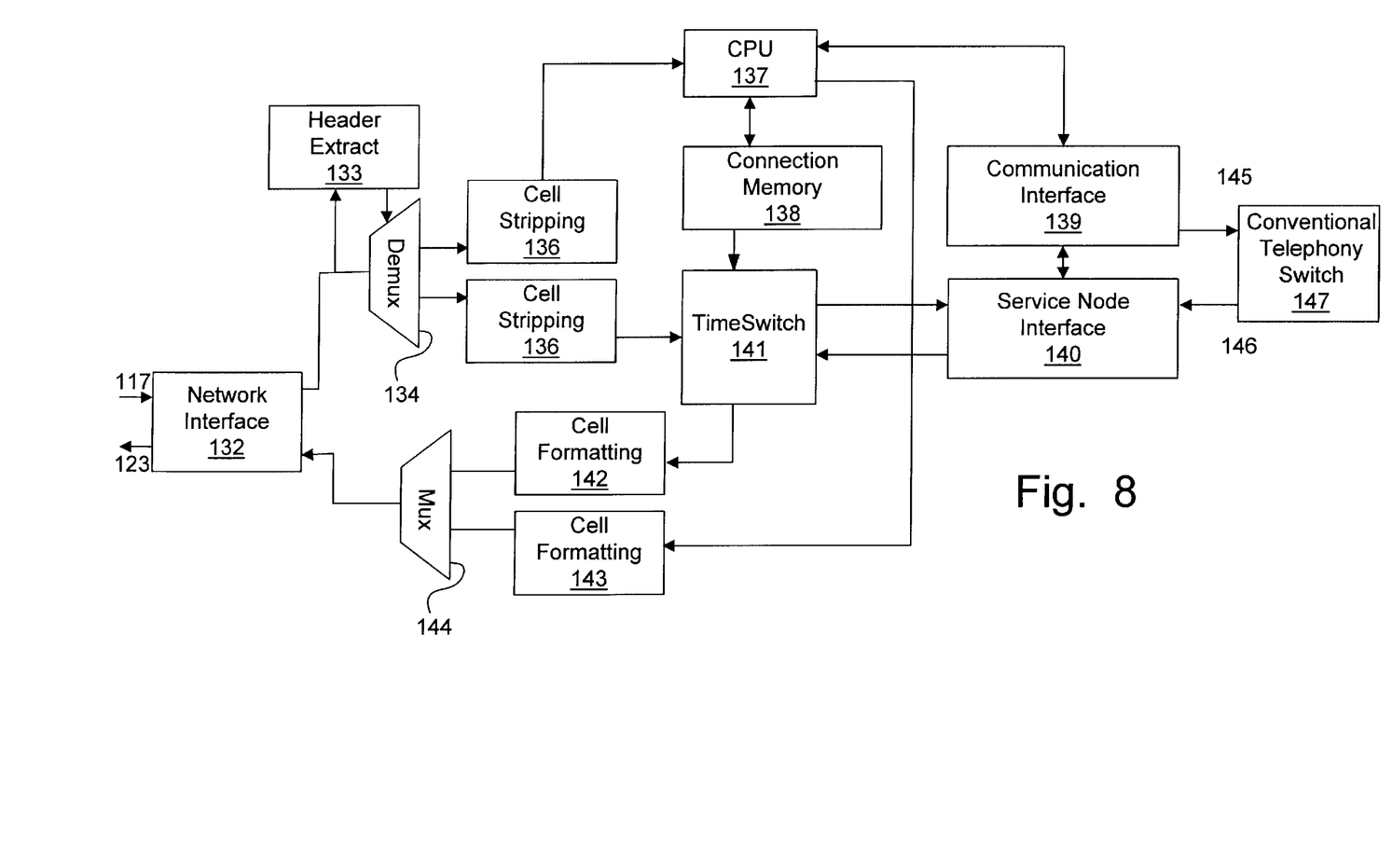
FIG. 8 is a block diagram of the service node interface of the present invention; and, FIG. 9 is a block diagram showing the end user systems being connected to a plurality of service providers by means of a generic connectivity network in accordance with the present invention.

It is anticipated that several types of service node interface modules will be required to support the various numbers of services that can be accommodated by the present invention. Shown in FIG. 8 is an example for interfacing a conventional telephony switch 147. Cell stream from the generic connectivity network over communication line 117 is processed by the network interface block 132. The cell header information is extracted by a header extract block 133 and is used to demultiplex the cells by cell demultiplexer 134. In this case, the cell stream is demultiplexed into two streams, one for control and signalling information 136, and the other for actual voiceband signals 135. A CPU 137 decodes the information and by the use of different protocols such as GR-303, will communicate with the conventional service node (voice switch) 147 through a communication interface 139. The conventional service node (voice switch) will handle this communication in the same manner as any other communication. It does not handle communications from the network implementation of the present invention in any different manner.

The voiceband information passes through a timeswitch 141 where it is re-arranged to match the ordering negotiated between the local CPU 137 emulating GR-303 and the telephony switch.

Traffic arriving from the conventional service node (voice switch) 145 received over communication line 146 is first received by a service node interface 140 and passed through the timeswitch 141. The output is then cell formatted by a cell formatter 142. The local CPU 137 can insert messages back into the network with its own cell interface 143. The different cell streams are then multiplexed by multiplexer 144 and sent to the network interface module via the network interface 132 and communication line 123.

Figure 9:
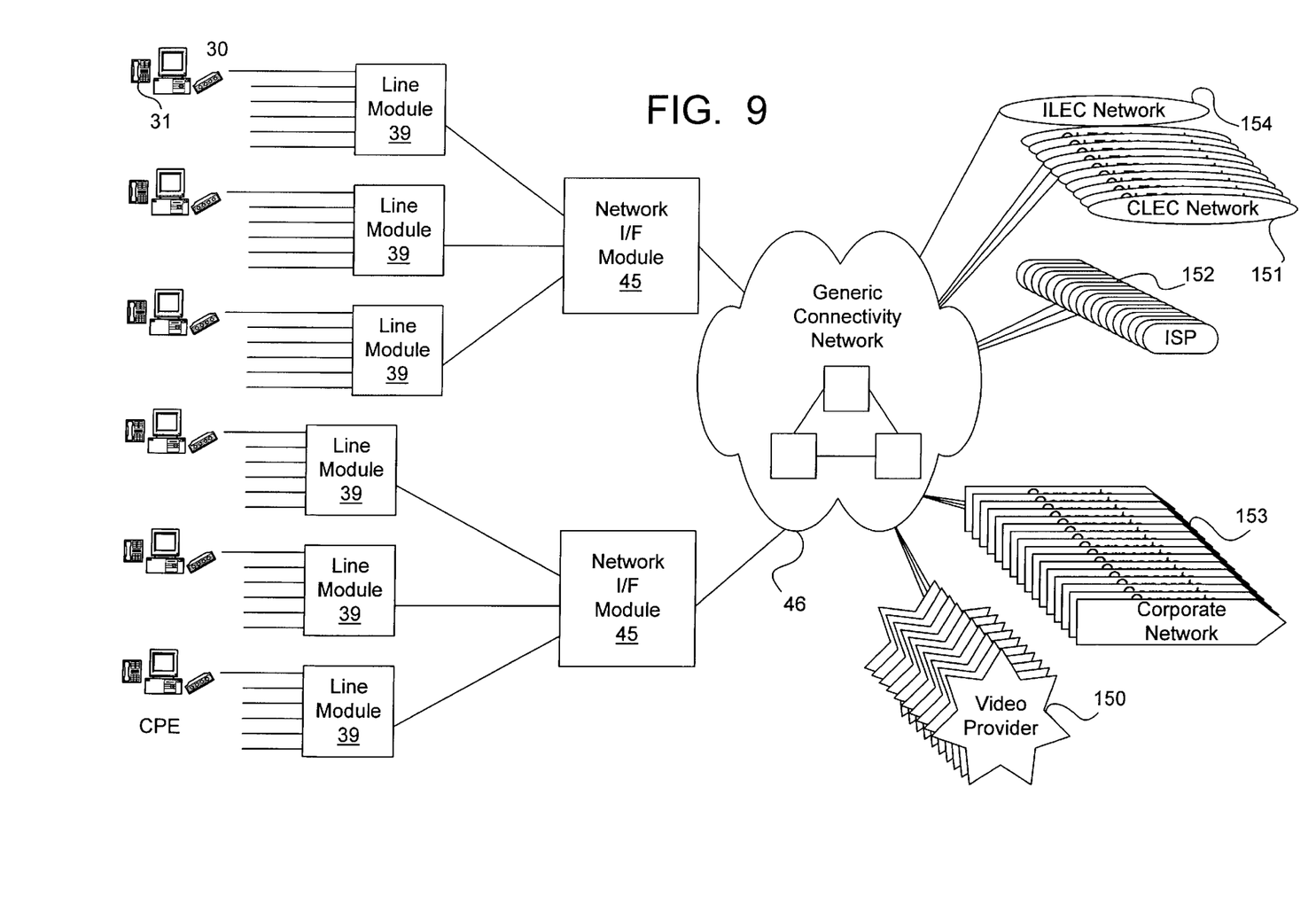

FIG. 9 is a block diagram showing the end user systems being connected to a plurality of CLECs by means of a generic connectivity network in accordance with the present invention. The benefits of using a generic connectivity network for the purposes of routing and transportation of traffic originating with and destined to the CLECs is apparent by examining FIG. 9. CPE devices 31 are connected to the line interface module 39 by means of the CPE connector 30. A plurality of line interface module 39 are connected to the NIM 45.

The benefits of scaleability offered by the present invention are understood when more than one NIM is to be used to connect with the CLECs at the far end. Without the use of a generic connectivity network, a large number of network connections must be supported by each NIM 45, with separate physical links to each CLEC service provider. In the example shown, this would require hundreds of separate links, which is clearly impractical. Instead, only one high-speed network connection to the generic connectivity network 46 per NIM 45 is required. The addition of new service providers is simply done by adding one network connection from the generic connectivity network 46 and setting up the proper routing information for use by the NIM 45 and the generic connectivity network 46.

Shown in FIG. 9 are connections to a wide variety of service providers, including an ILEC network 150, a plurality of CLEC networks 151, a plurality of Internet Service Providers 152, a plurality of corporate networks 153, as well as a plurality of video providers 154. All of these service providers can be accessed by means of the present invention in a manner that is highly scalable, cost effective to deploy, and easy to administer.

What is claimed is:

1. An apparatus for providing a competing local exchange carrier unbundled access to a subscriber line, the apparatus comprising:

a line interface module connected to and terminating said subscriber line, said line interface module having a first output connected to a service node of an incumbent local exchange carrier and a second output connected to a network interface module, a database storing provisioning information for said subscriber line, the provisioning information being indicative of whether traffic on said subscriber line will be switched to said service node of said incumbent local exchange carrier, or be switched to said network interface module for forwarding to a service node of said competing local exchange carrier;

the line interface module being adapted to switch traffic received on said subscriber line selectively to the first output or the second output in accordance with said provisioning information for said subscriber line stored in said database;

said network interface module providing an interface between one or more line interface modules and a generic connectivity network, said generic connectivity network having a plurality of interconnected switches and transmission equipment for transmitting traffic appearing at the network interface module to said service node of said competing local exchange carrier without transmitting said traffic over a public switched telephone network;

the line interface module and the network interface module working in tandem with each other to allow the competing local exchange carrier to have access to said subscriber line without the need for physical unbundling of said subscriber line from said incumbent local exchange carrier.

2. The apparatus of claim 1 wherein said line interface module comprises a connection memory for storing said database, and wherein a timeswitch connected to said connection memory switches a POTS call received on said subscriber line selectively to the first output or the second output in accordance with said provisioning information.

3. The apparatus of claim 2 wherein said second output comprises a cell multiplexer for multiplexing POTS calls received from said timeswitch to form cells for transmission to said network interface module.

4. The apparatus of claim 2 wherein said line interface module includes a high-speed data portion which is adapted to switch high-speed data traffic received on said subscriber line to the second output.

5. The apparatus of claim 4 wherein said high-speed data portion includes:

a demodulator and cell formatter for demodulating and formatting said high-speed data traffic into cells;

a cell multiplexer for multiplexing cells received from said demodulator and cell formatter into a cell stream, said cell multiplexer being connected to said second output.

6. The apparatus of claim 4 wherein said second output comprises a cell multiplexer for multiplexing POTS calls received from said timeswitch with high-speed data traffic received from said high-speed data portion to form cells for transmission to said network interface module.

7. The apparatus of claim 1 wherein said network interface module comprises switching equipment for performing a switching process of said traffic consisting of cells, each cell consisting of data and a cell header, said cell to be transmitted at a predetermined data rate, said switching equipment comprising:

a cell multiplexer portion for multiplexing cells received from said line interface module to form a cell stream;

a network interface portion connected to said cell multiplex portion for transmitting and receiving said cell stream to and from said generic connectivity network; and a cell demultiplexer portion for demultiplexing said cell stream to form cells destined for transmission to said line interface module, said cell demultiplexer portion including a traffic shaping/pacing controller for regulating the data rate of said cells.

8. The apparatus of claim 1 wherein said subscriber line is connected to customer premises equipment, said customer premises equipment including a telephone and a plurality of user terminals connected to a customer premises equipment connector.

9. The apparatus of claim 8 wherein said customer premises equipment connector comprises:

a user-side telephone interface for receiving telephony signals from said telephone, at least one user-side digital interface for receiving digital signals from said user terminals, a multiplexer for multiplexing said telephony signals and said digital signals into one group of cells;

a network-side high-speed interface connected to said multiplexer for transmitting said group of cells to said line interface module.

10. The apparatus of claim 8 wherein said customer premises equipment connector can communicate with networks which encompass one or more of data networks, wireless networks, satellite networks, CATV, ATM networks.

11. The apparatus of claim 8 wherein said user terminals can transmit and receive communication signals which encompass one or more of telephone, fax, modem, video, and data signals.

12. The apparatus of claim 1 wherein said generic connectivity network comprises one or more of ATM networks, Internet Protocol networks, frame relay networks, X.25 networks, and SMDS networks.

13. The apparatus of claim 1 wherein said subscriber line is comprised of one of copper wire, coax cable, and fibre optic cable.

14. The apparatus of claim 1 wherein said network interface module comprises switching equipment for performing a switching process of said traffic consisting of cells, each cell consisting of data and a cell header, said switching equipment comprising:

a cell multiplexer portion for multiplexing cells received from said line interface module to form a cell stream; and a network interface portion connected to said cell multiplex portion for transmitting said cell stream to said generic connectivity network.

15. The apparatus of claim 1 wherein said network interface module comprises switching equipment for performing a switching process of said traffic consisting of cells, each cell consisting of data and a cell header, said switching equipment comprising:

a network interface portion connected to a cell multiplex portion for receiving a cell stream from said generic connectivity network; and a cell demultiplexer portion for demultiplexing said cell stream to form cells destined for transmission to said line interface module, said cell demultiplexer portion including a traffic shaping/pacing controller for regulating a data rate of said cells.

16. A method for providing a competing local exchange carrier unbundled access to a subscriber line, said method comprising the steps of:

storing provisioning information for said subscriber line, the provisioning information being indicative of whether traffic on said subscriber line will be switched to a service node of an incumbent local exchange carrier, or be switched to a network interface module for forwarding to a service node of said competing local exchange carrier;

receiving traffic from said subscriber line at a line interface module;

said line interface module switching said traffic selectively to a first output or a second output in accordance with said provisioning information for said subscriber line;

if said traffic is switched to said first output, said traffic being forwarded to a service node of an incumbent local exchange carrier;

if said traffic is switched to said second output, said network interface module receiving said traffic and setting up a traffic path through a generic connectivity network to a service node operated by said competing local exchange carrier without transmitting said traffic over a public switched telephone network.

* * * * *